United States Patent
Dalal et al.

(10) Patent No.: US 8,861,023 B2
(45) Date of Patent: Oct. 14, 2014

(54) GENERATING AN UNAMBIGUOUS DEFINITION OF DESIGNER INTENDED COLORS IN A DOCUMENT CREATION APPLICATION

(75) Inventors: Edul N. Dalal, Webster, NY (US);
Wencheng Wu, Webster, NY (US);
Robert J. Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 596 days.

(21) Appl. No.: 13/023,822

(22) Filed: Feb. 9, 2011

(65) Prior Publication Data

US 2012/0200864 A1    Aug. 9, 2012

(51) Int. Cl.
*H04N 1/60*    (2006.01)
*H04N 1/54*    (2006.01)
*H04N 1/62*    (2006.01)

(52) U.S. Cl.
CPC ............... *H04N 1/54* (2013.01); *H04N 1/603* (2013.01); *H04N 1/628* (2013.01)
USPC ............................................ 358/1.9; 358/518

(58) Field of Classification Search
USPC ........................................................ 358/1.9
See application file for complete search history.

(56) References Cited

U.S. PATENT DOCUMENTS

| | | | |
|---|---|---|---|
| 4,670,780 A * | 6/1987 | McManus et al. | 358/518 |
| 5,414,538 A | 5/1995 | Eschbach | |
| 5,900,952 A | 5/1999 | Fan | |
| 7,136,188 B2 * | 11/2006 | Kondo | 358/1.9 |
| 7,307,760 B2 | 12/2007 | Jacobs et al. | |
| 7,639,401 B2 | 12/2009 | Bala et al. | |
| 8,243,325 B2 * | 8/2012 | Eschbach | 358/1.9 |
| 8,610,953 B2 * | 12/2013 | Takabayashi et al. | 358/2.1 |
| 2005/0179918 A1 * | 8/2005 | Kurumisawa et al. | 358/1.9 |
| 2007/0291287 A1 * | 12/2007 | Snyder et al. | 358/1.9 |
| 2008/0174796 A1 * | 7/2008 | Yoo | 358/1.9 |
| 2011/0149311 A1 * | 6/2011 | Mestha et al. | 358/1.9 |

* cited by examiner

*Primary Examiner* — Dung Tran
(74) *Attorney, Agent, or Firm* — Philip E. Blair; Fleit Gibbons Gutman Bongini & Bianco P.L.

(57) ABSTRACT

What is disclosed is a novel system and method for determining and capturing the designer intended colors in an image so that the printer has an accurate color rendition target. The present method operates by capturing the monitor RGB values together with the monitor profile to get a representation of the intended image in a device-independent color space like L*a*b*. The teachings hereof work for vector graphics as well as raster images. Advantageously, this invention solves a real problem currently existing, for example, in the packaging print market, wherein colors produced from multiple spot colors with their overlays and blends are not well color managed.

16 Claims, 4 Drawing Sheets

GENERATING AN UNAMBIGUOUS DEFINITION OF DESIGNER INTENDED COLORS IN A DOCUMENT CREATION APPLICATION

TECHNICAL FIELD

The present invention is directed to systems and methods for determining designer intended colors contained within a document displayed on a monitor device so that the print device being used to render the document has an accurate color rendition target.

BACKGROUND

Graphic designers routinely create document files in CMYK or spot color. In order to render these image files correctly on a document reproduction device, it is often necessary to determine the precise color that the document's designer intended. There would be no confusion of the designer's intent if the image files were created in device-independent color spaces such as L*a*b*. But that is almost never done. Designers typically adjust colors of their graphic art and content objects contained within their documents until the images displayed on their monitor have the precise colors the designer wants their customers to see. The resulting CMYK or spot color data contained in the document's associated files does not accurately describe the designer intended color due to various reasons, including the algorithms used by the application software and device monitors having non-standard responses.

In response to a customer's inquiry about inaccurate printer color rendition of a vector graphic document containing a large background area described by Pantone® PMS colors and tints, it was determined that the printer was rendering the Pantone colors relatively accurately, but the rendered colors were not the exact colors which the designer saw on their monitor when they created that document. The problem actually becomes worse when the document designer incorporates various Pantone blends and sweeps of Pantone colors, which is rather common in packaging applications which use spot colors like process colors with blends and sweeps occurring between spot colors. Presently, there is no well-defined method for determining what the precise color was that the designer intended by their respective color call-outs as there are presently no standards for inferring what the L*a*b* color is when Pantone colors are blended and used like process colors. Real life cases abound where the DFE cannot correctly decipher the designer intended colors. As a consequence, the resulting color errors seen in the document print are wrongly attributed to a short-coming of the print device.

Accordingly, what is needed in this art is a system and method for determining designer intended colors contained within a document displayed on a monitor device so that the print device being used to render the designer's document has an accurate color rendition target.

INCORPORATED REFERENCES

The following U.S. Patents, U.S. Patent Applications, and Publications are incorporated herein in their entirety by reference.

"Image-Dependent Exposure Enhancement", U.S. Pat. No. 5,414,538, to Eschbach.

"System For Converting Color Image Signals Having High-Frequency Components From RGB To CMY Color Spaces", U.S. Pat. No. 5,900,952, to Fan.

"Raster Image Path Architecture", U.S. Pat. No. 7,307,760, to Jacobs et al.

"Camera-Based Method For Calibrating Color Displays", U.S. Pat. No. 7,639,401, to Bala et al.

BRIEF SUMMARY

What is disclosed is a novel system and method for determining designer intended colors contained within a document displayed on a monitor device so that the print device being used to render the designer's document has an accurate color rendition target. The present method captures the monitor RGB values and uses the monitor's profile to get a representation of the intended image in a device-independent color space like L*a*b*. In such a manner, the original colors intended by the designer as seen on the monitor at the time of document creation can be unambiguously defined. The present method works equally well for vector graphics and raster images. The teachings hereof have considerable value in the document reproduction arts as designers often create document designs using colors which are incorrectly coded by the graphic arts application, i.e., ambiguously defined, and thus not the same as what the designer actually saw displayed.

In one example embodiment, the present method for reproducing a designer intended color when the color is ambiguously defined involves performing the following. First, the color signals being used by the monitor device to display the designer's document containing the intended colors are captured. The captured signals are processed to obtain respective color values in a desired color space. In one embodiment, the color signals are captured in response to an initiating event such as, for instance, the designer saving the document file. In a manner more fully described herein, the color values derived from the captured signals are used to generate an unambiguous definition of the designer intended color. That definition can then be provided to a color management system of a document reproduction device for accurate rendition of the designer intended color(s). Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a novel system and method for determining designer intended colors contained within a document displayed on a monitor device so that the print device being used to render the designer's document has an accurate color rendition target. The present method captures the monitor RGB values and uses the monitor's profile to get a representation of the intended image in a device-independent color space like L*a*b*. In such a manner, the original colors intended by the designer as seen on the monitor at the time of document creation can be unambiguously defined.

It should be understood that one of ordinary skill in this art would be readily familiar with various aspects of color science such as, for example, color spaces, color manipulations, and the like, including various aspects of color rendering on a document reproduction device. Such skills should further include a working knowledge of monitor devices, color signals, video signal processing, display profiles, and various techniques for capturing color values from a signal sent to a monitor device. Those of ordinary skill would be familiar with the text: "*Digital Color Imaging Handbook'*", 1st Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference. Moreover, one of ordinary skill would be familiar with "*PDF Reference: Version* 1.4 (3rd Edition)", Addison-Wesley (2002), ISBN-13: 97802-0175-8399 which is also incorporated herein in its entirety by reference.

NON-LIMITING DEFINITIONS

Figure 1:
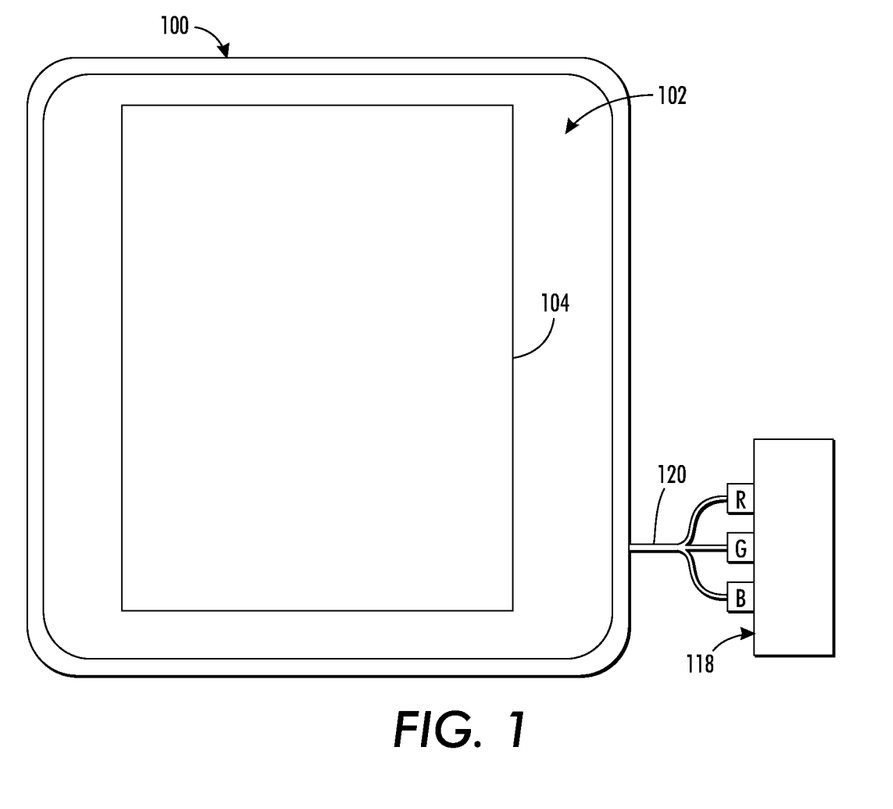
FIG. 1 shows an example monitor device displaying a first page of a designer document containing designer intended colors.

A "document", as used herein, means a displayed image file containing color critical content. Objects contained within a document having color critical content include: contone objects, text, images, line art, plots, graphics, halftone objects, and solid fill objects, or any combination thereof. FIG. 1 shows an example document containing various color critical content displayed on a monitor. Document may be created by a designer in a CMYK color space or in one or more spot colors. Document image files may contain objects which are in the form of vector graphics and/or raster images. Example designer documents are: company brochures, advertising literature, marketing materials, reports, and the like.

A "document designer", or simply "designer", is a person who uses document creation application software such as, for instance, Adobe® Creative Suite, to create documents on a computer workstation, desktop or laptop computing device. Document designers adjust the colors contained within their documents until they appear as desired.

A "designer intended color" means a color as seen by the designer on the monitor. The teachings hereof are directed toward determining a definition for a designer intended color such that the color, as seen by the designer, is unambiguously defined and thus can be accurately reproduced. As stated in the background hereof, there would be little confusion of a designer's intent for any given color if the image files were created in a device-independent space like Lab. However, this is not often the case. As such, the resulting CMYK or spot color data contained within the image file generated does not accurately describe the color which the designer intended to have reproduced.

A "spot color" is any color generated by an ink (pure or mixed) that can be printed using a single run. Although spot colors are primarily intended to be used alone, it is increasingly common, especially in the packaging industry, to make tints, blends, sweeps and various other forms of combinations of spot colors.

A "device-dependent color" is a color which is defined by a color space that is non-standard and cannot be used to commonly define colors without additional information such as an understanding of the characteristics of the rendering device.

A "device-independent color" is a color which is defined by any standard color space which is commonly used to define or describe that color, e.g. CIE XYZ, CIE L*a*b*, CIE L*u*v*, sRGB etc.

A "definition of a designer intended color" unambiguously defines the designer intended color. Such a definition can be a definition of a spot color, or a definition of a mixture of two or more colors (tint or sweep) with at least one of the colors being a spot color. Such a definition provides a linkage between a spot color and the L*a*b* space, or equivalently, a linkage between a spot color and captured RGB signal+display profile. For example, the relationship between the image file data (e.g., 50% Pantone 325C+20% Pantone 421C) and the intended RGB (or L*a*b* values) comprises the definition of the designer intended color. Of course, if RGB is taken then the profile must also be included (or implied) so using either RGB or L*a*b*, the net effect is that L*a*b* becomes available as the rendition target.

A "monitor", as is widely known in the arts, is an electronic display device typically associated with a computer system and generally comprises a display, circuitry, and a protective enclosure. Many monitors use the RGB additive (e.g., primary-based) color space wherein each pixel on the display comprises separate red, green, and blue light sources. At common viewing distances, the light sources are indistinguishable to the human eye. Special purpose processors, such as those in video cards, process RGB buffer values. These values are converted to intensities or voltages. A gamma correction is applied to compensate for nonlinearities in the system. Some RGB standards specify the gamma value and other parameters. As used herein, the term 'monitor' is intended to refer to any visual display such as, for instance, TV's, Plasma, CRT, LCD, LED, and the like, capable of receiving a color signal of a document image file containing at least one designer intended color and producing a viewable image of that document file.

"Color signals" are the RGB values held within the memory of the program which is being used for the graphical design. For example, RGB vales are loaded into the video card, which then displays to the monitor.

A "monitor profile" provides a means for translating color values to the color space of a monitor device, as are well known in the arts. The monitor profile may take the form of a multi-dimensional look-up table (LUT), matrices, and tone reproduction curves (TRCs). The ICC provides vendor-neutral cross-platform color management standards. Such standards permit the exchange of device characteristics and color spaces by dividing color devices into three broad categories: input devices, display devices, and output devices. For each category, a series of color transformations are defined that perform the conversion between different color spaces. The color signals to be captured in accordance herewith are those of display devices.

A "color management system" is either a hardware or software system (or a combination thereof) that adjusts numerical values that get sent to a color marking device so that the perceived colors they produce remain consistent, provided the devices are capable of delivering the needed color intensities. Color management systems utilize mathematical algorithms to transform an input color space to an output color space. Such a system may be incorporated, in whole or in part, within a color marking device or may be a separate system altogether such as, for instance, a standalone API.

A "color marking device" is any device or system having an image forming apparatus for producing an output print of a document. One example color marking device is shown at 430 of FIG. 4. The set of color marking devices includes monochrome or color digital document reproduction architectures, document scanning systems, a wide variety of printers/copiers, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. Providing the image of a document to such an output device is intended to mean communicating the image to the output device by transmitting the image in the form of signals over a network connection, interface, or other communication pathway, for rendering to viewable form. The step of providing the image to an output device is also intended to include storing the signals of the digital document image to a memory or storage media for subsequent retrieval. A color marking device may include an image processing system which performs the methods described herein further. The image processing system can be hardware and/or software which may reside in the image path. It should also be understood that one or more functions, features, or capabilities performed by a computer system or special purpose processor (such as an ASIC), may be integrated, in whole or in part, with any system or sub-system of such a system.

Example Monitor and Designer Document

Reference is now being made to FIG. 1 which shows an example monitor device displaying a first page of a designer document containing designer intended colors.

In FIG. 1, the example document 104 is shown displayed on display 102 of monitor 100. The displayed page is a page of an example designer document containing one or more designer intended colors. For example, a portion of the designer document may have been created using Spot Color-1 and another using Spot Color-6. Yet another may comprise a 50% tint of Spot Color-2 or a mixture of 50% Spot Color-3 and 50% Spot Color-4. Still another portion may comprise a gradation (sweep) from Spot Color-5 to 75% Spot Color-6. Also shown connected to monitor 100 is cable 120 for receiving color signals from device 118. Device 118 can be, for example, a graphics video card in communication with a computing device. The operating system of the desktop computer is executing a document creating application software package being used by the designer to create the designer document 104.

Example RGB Signal Processing Environment

Figure 2:
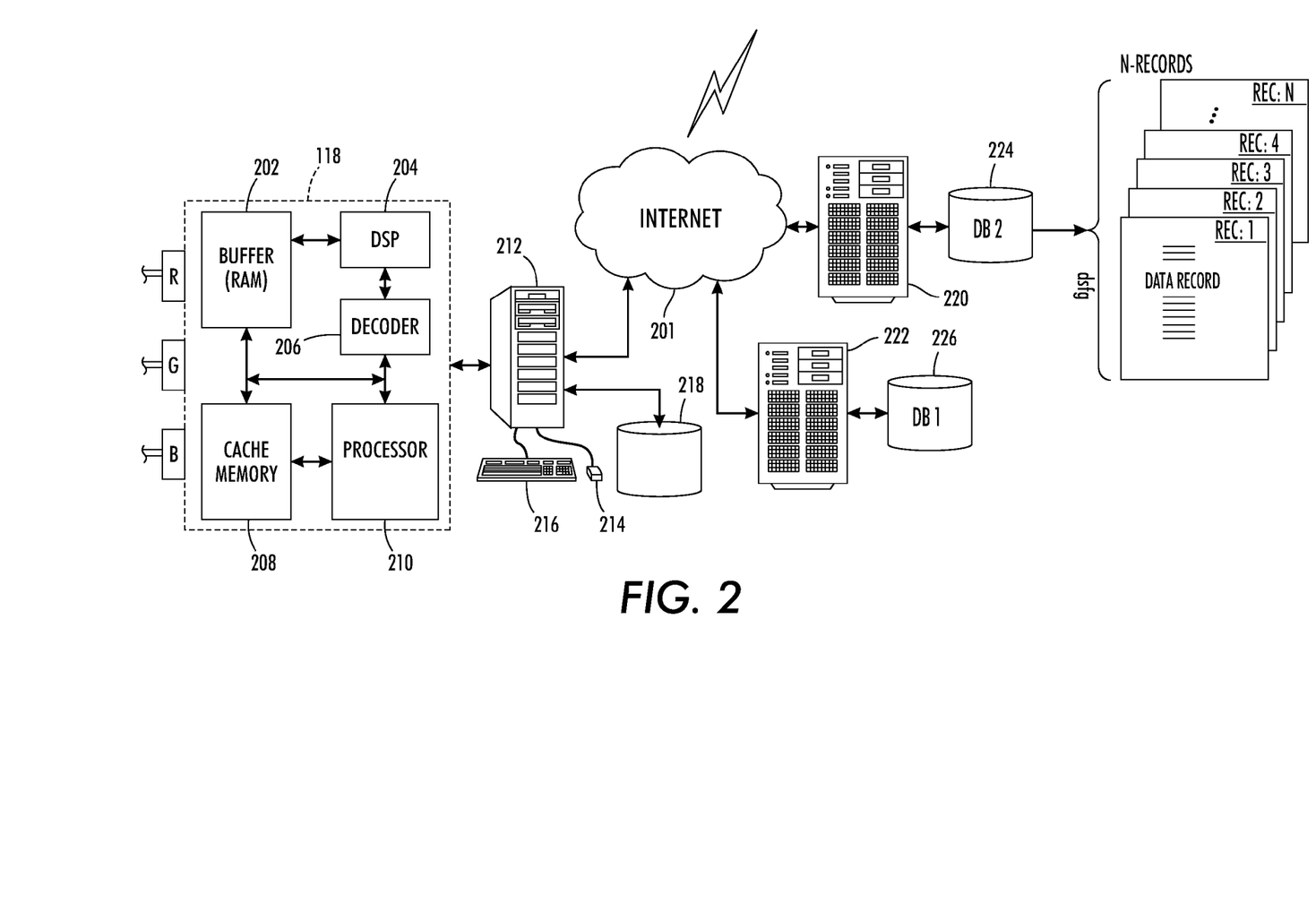
FIG. 2 illustrates an example networked computing environment wherein the color signals are processed.

Reference is now being made to FIG. 2 which illustrates an example system wherein the color signals are processed. RGB color model is an additive color model in which red, green, and blue light are added together to reproduce colors. RGB is a device-dependent color model, i.e., their response to the individual R, G, and B levels varies across manufacturers, or even in the same device over time. RGB is a component video signal used in the electronics industry which consists of three signals: Red, Green, and Blue, transmitted via separate cables/pins. Extra cables may be needed to carry synchronization signals. RGB signal formats are often based on modified versions of the RS-170 and RS-343 standards for monochrome video.

In FIG. 2, RGB signals are captured by device 118 and provided to monitor 100 of FIG. 1. Generated RGB signals used to display the designer document on monitor 100 are received into Buffer 202. Digital Signal Processor (DSP) 204 utilizes special purpose circuitry to process vertical and horizontal components of the RGB signals. Encoder/Decoder 206 associates bits (or bit groupings) with each RGB component of the RGB signal. Cache memory 208 stores data and machine readable program instructions which facilitate the processing of the RGB signals. All or part of device 118 may comprise a hardware implementation such as a video card, an ASIC, or be provided as part of a software plug-in. In one embodiment, all of the functionality of capturing and processing RGB signals in accordance herewith is entirely performed by a plug-in available for graphic arts application software as is used by designers such as, for example, Adobe Illustrator, Quark Xpress, Photoshop, etc. Such a plug-in captures the RGB signals sent to the monitor display at defined logical points during the creation and/or editing of the image file and generates a definition of the designer intended color(s).

Workstation 212 is in communication with storage device 218 which stores the generated definition(s). Storage device 218 also stores machine executable program instructions for performing the various aspects hereof. The workstation is connected to network 201 via a wired communication pathway. Such a pathway may be wireless. The generated definition(s) can be communicated over network 201 to servers 220 and 222. Information about the captured RGB signals including information about the associated objects/areas of the designer's document may also be transmitted over network 201 and stored using a plurality of records in databases 224 and 226. Workstation 212 may retrieve any of the stored records, or may signal servers 220 and 222 to retrieve the records and provide those to a remote device over the network for processing. Such a system includes one or more communication devices capable of transmitting data over a network via a cable, modem, router, and the like. The workstation incorporates local storage such as a CD-ROM, hard disk, magnetic media, or other device wherein a removable media is inserted and data deposited thereon for subsequent storage and retrieval.

In the embodiment of FIG. 2, workstation 212 is in communication with monitor 100 of FIG. 1, mouse 214, and keyboard 216 which collectively comprise a graphical user interface. This user interface enables the designer to select one or more objects or areas of the document currently displayed on the monitor for processing. A user or operator can provide identification information about any of the content objects in the displayed document using the graphical user interface. The user may select one or more areas or objects in the displayed document page for identification as a designer intended color for processing. In various embodiments, the user resizes, i.e., enlarges or reduces, the displayed page using software tools which have been pre-loaded. The user may further set parameters and enter instructions for various operations via a touch screen display. Such a system further includes various device controllers and other special purpose processors capable of executing machine executable program instructions.

Example Flow Diagram

Figure 3:
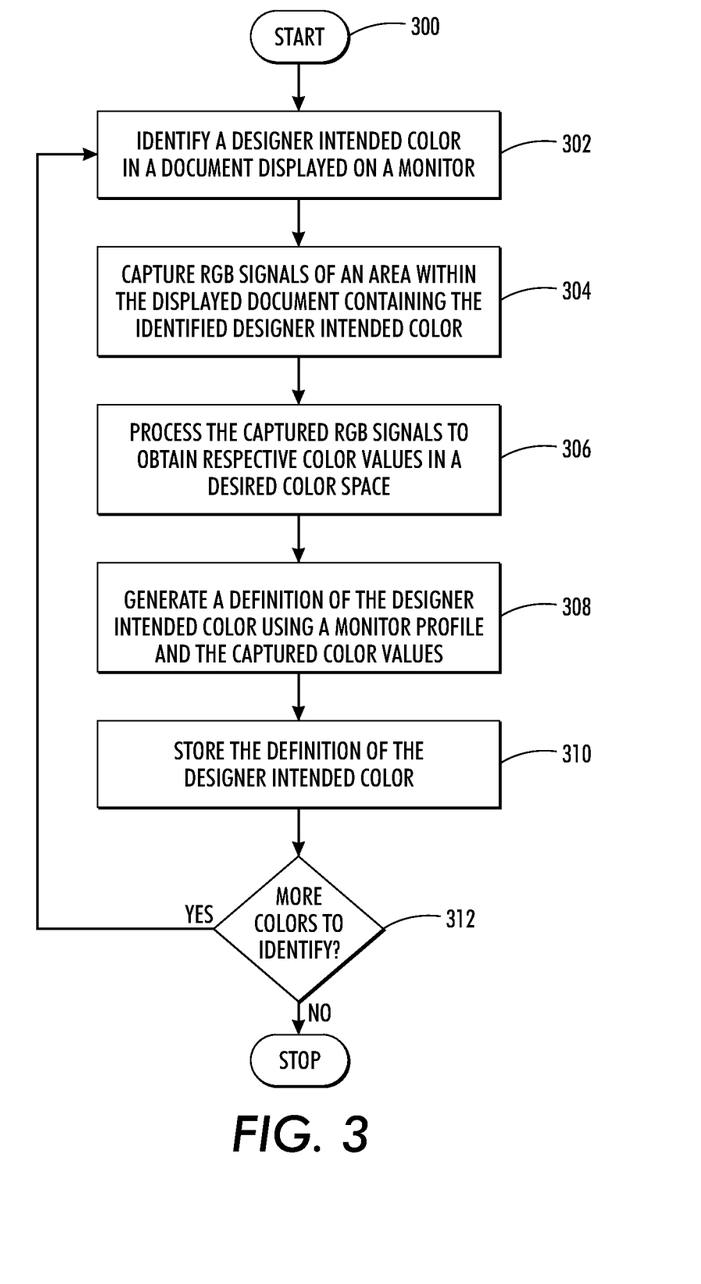
FIG. 3 is a flow diagram of one example embodiment of the present method for capturing the designer intended colors of a displayed document image and producing a definition of the intended colors such that the printer has an accurate color rendition target.

Reference is now being made to the flow diagram of FIG. 3 which illustrates one example embodiment of the present method for capturing the designer intended colors of a displayed document page and producing a definition of the designer intended colors. The method starts at 300 and immediately proceeds to step 302.

At step 302, a designer intended color is identified in a document displayed on a monitor device. One example document displayed on a monitor device is shown and discussed with respect to document 104 of FIG. 1. A graphical user interface may be used to identify the designer intended colors to be processed. The designer intended colors may also be specified at the various gradient stops defined in the software application being used by the designer.

At step 304, RGB signals used to display the designer intended colors on the monitor are captured. Video boards are well suited for capturing high resolution analog RGB signals. Such video boards capture analog RGB or digital DVI data via onboard buffers such as Buffers 202 of FIG. 2. For raster images, RGB values are captured in a pixel-wise manner from a bitmap of the image file. The RGB values can be stored in addition to the original CMYK or spot color data, or may replace them entirely. The RGB values, as well as the CMYK or spot color data, can be stored at a lower resolution with interpolation being used to interpret the colors at other pixels. For image files in a vector graphics format, RGB values can be captured at locations corresponding to the CMYK values or spot colors. Since, in principle, only one RGB value needs to be captured for even large areas of uniform color, color conversion can be very efficient and storage requirements kept to a minimum. Such methods become a bit more complicated when complex mixtures of spot colors, such as sweeps and blends, are the designer intended colors. In such cases, relevant nodes on the sweeps and blends such as pure spot colors and/or discrete combinations of spot colors, e.g., 25% Spot Color-1+75% Spot Color-2 can be chosen or preselected and corresponding RGB values captured. Intermediate colors can be obtained therefrom using an interpolation.

At step 306, the captured RGB signals are processed to obtain associated color values. The above-incorporated U.S. Pat. No. 5,414,538 teaches separating captured RGB signals and converting the low frequency components into CMY signals via a look-up table and the high-frequency components into CMY signals via linear algorithms.

At step 308, the associated color values are used to generate a definition of the designer intended color. As previously described, such a definition can be a definition of a spot color, or a definition of a mixture of two or more colors with at least one of the colors being a spot color. To effectuate this, the color values of the captured RGB signals are processed through the monitor profile to obtain device-independent color values (in Lab space). When the designer completes their design, the application software converts the document to a PDF format which provides color definitions for all the objects contained within the document. The PDF is analyzed and the current Adobe Bridge Color Settings are obtained. If there are any spot colors contained within the PDF, those are converted to the current display RGB using the monitor profiles and settings obtained from the Adobe Bridge. In such a manner, RGB values of the displayed content are obtained. Additional information embedded in the PDF can also be used as an alternative color definition for the spot colors. For most objects, their respective associated color definitions are the current color set defined in the PDF graphics state. These can be converted to screen color values. RGB values and the current profile for the monitor display are sufficient to define a device-independent color. For a gradation or vignette, it is more complicated but the same idea applies. (See: PDF Reference 3rd Edition, Version 1.4, Section 4.6 'Shading Operator') The actual color mixing model is encoded as the 'ShadingType', so we do not have to encode a raster version of the tinted mixture. Examples further include 'Axial' and 'Radial' where the two endpoint colors are defined, and the spatial extent of the mixing is calculated at rendering time by mixing these two colors according to the specified function. In this case there is a more general set of colors in the 'ColorSpace' array of the 'Shading Dictionary' within PDF. Each of the colors in the ColorSpace array are first converted to display RGB and then into a device-independent color description. One caveat is that there is often a non-linear transform between color spaces. As such, if one defines an 'Axial' shading from Spot Color-3 to Spot Color-4 will likely be a somewhat different color than a 50% mixture of the two LAB equivalents of the two spot colors defined at the endpoint of the blend. In all cases, the resulting device-independent color can be encoded as an 'Alternate Color Space', specifically the device-independent color values derived from the display RGB values and the display ICC profile. In those instances where the monitor profile is not available or not accessible, a default standard interpretation, such as sRGB or AdobeRGB, can be used, depending on the monitor. Alternatively, a plug-in is used to evoke characterization routines to build the profile. One such characterization routine builds the monitor profile from color values measured directly from the monitor display using a colorimeter or spectrophotometer.

At step 310, the definition of the designer intended color is provided to a storage device, or communicated to a color management system of a document reproduction device for accurate rendition of the designer's intended colors, or communicated to a remote device over a network for further processing or storage. Other information associated with the color definition such as, for instance, the RGB signals themselves, or the color values obtained thereby, or the software routines employed, may also be stored or provided to a remote device over the network for storage or processing.

At step 312, a determination is made whether any more colors remain to be processed. If so then processing returns to step 302 wherein a next designer intended color is selected for processing. Processing repeats for the next identified designer intended color until all intended colors have been processed. Once all the designer intended colors have been processed, further processing stops.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims. All or portions of the flow diagrams may be implemented partially or fully in hardware in conjunction with machine executable instructions in communication with various components of such a system.

Example Block Diagram

Figure 4:
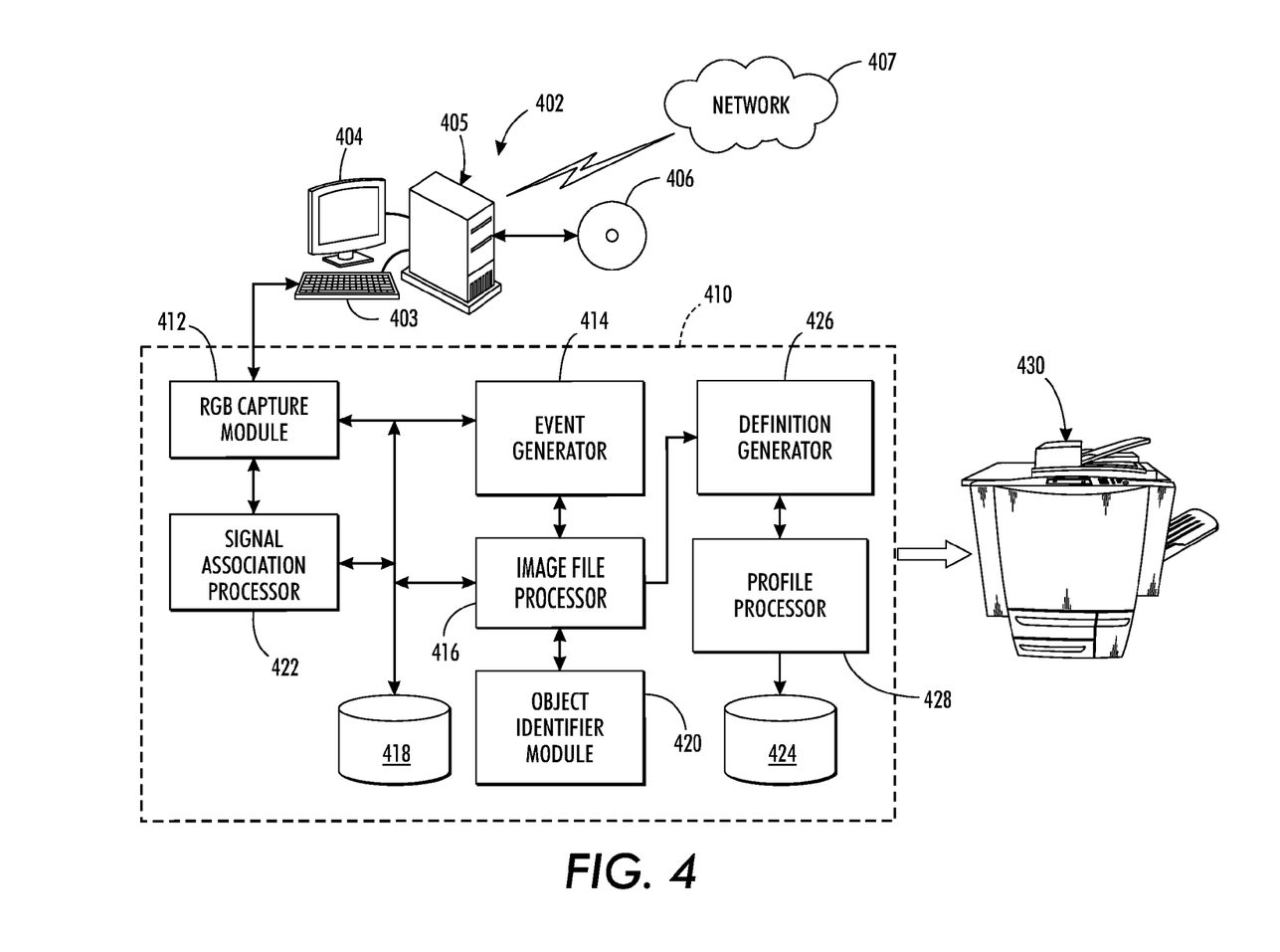
FIG. 4 is a block diagram of an example system for performing various aspects of the present method as described with respect to the flow diagram of FIG. 3.

Reference is now being made to the block diagram of FIG. 4 which illustrates an example system for performing various aspects of the present method as described with respect to the flow diagram of FIG. 3.

The system of FIG. 4 is shown generally comprising a workstation 402 which includes a graphical user interface comprising a keyboard 403 and monitor 404, a special purpose computer 410, and a color marking device 430. Computer case 405 houses a motherboard, processor, hard drive, CD-ROM drive, and a network card. Rewriteable media 406 stores executable machine readable program instructions and data. Although not shown, monitor 404 has displayed thereon the example document 104 of FIG. 1. Monitor 404 is in communication with a graphics video card contained within computer case 405. The operating system of the workstation is executing a document creation application software package. Workstation 402 is in communication with one or more remote devices over network 407. RGB Capture Module 412 captures the RGB signals in response to a signal from Event Generator 414. Such a signal may be generated at logical points during document creation and/or editing, or in response to an event initiated by the designer such as saving the document. Event Generator 414 utilizes internal memory for storing a predetermined number of event-driven time intervals or machine executable program instructions defining events which may initiated by the designer. Captured RGB signals are provided to storage device 418. Image File Processor 416 is in communication with Object Identifier Module 420 which collectively functions to track objects displayed on monitor 404 and associate color values. Signal Association Processor 422 associates captured RGB signals with pixels of areas and/or content objects displayed on the monitor. Processor 422 further receives a user input identifying areas within the displayed designer document wherein designer intended colors are located. Identification of displayed portions of the designer document may be effectuated within a software plug-in or API designed to perform this functionality. Profile Processor 428 retrieves the monitor profile from device 424 and in conjunction with Definition Generator 426 produces the definition(s) of the designer intended color(s). The generated definitions are provided to storage device 424. In the embodiment of FIG. 4, the generated definitions are also provided with the image file of the document to print device 430 for accurate rendition of the designer's document.

It should be appreciated that any of the modules shown and described with respect to FIG. 4 are in communication with computer workstation 402. Some or all of the functionality described with respect to any of the modules of FIG. 4 may be performed, in whole or in part, by workstation 402 or by a software program or plug-in. It should be appreciated that a module may designate one or more components comprising software and/or hardware. A plurality of modules may collectively perform a single function. A plurality of modules may be executed by either a single special purpose computer system or a plurality of special purpose systems operating in parallel. Connections between modules include both physical and logical connections. Modules may further comprise an operating system, drivers, controllers, and other apparatuses some or all of which may be connected to a network. Generally, various modules include routines, objects, components, etc., that are designed to perform particular tasks. Data structures may be employed to implement abstract data types, as are known in the programming arts, to store variables and data used in computations.

Those skilled in this art will appreciate that the teachings hereof may be practiced, in whole or in part, in a multi-processor system, a hand-held device, or a plug-in. Various aspects of such a system would function in accordance with program instructions to carry out the methods disclosed herein. The methods hereof can be implemented as a routine embedded on a personal computer or as a resource residing on a server or workstation, such as a routine embedded in a plug-in. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system or leverage off-the-shelf graphics software. The teachings hereof may be implemented using any known or later developed systems, structures, devices, and/or software by those skilled in the applicable art without undue experimentation from the functional description provided herein with a general knowledge of the relevant arts. The methods hereof can be implemented as a routine or as a resource residing on a server or workstation, or embedded in a plug-in, and the like.

One or more aspects of the methods described herein are intended to be incorporated in an article of manufacture, including one or more computer program products, having computer usable or machine readable media. For purposes hereof, a computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be shipped, sold, leased, or otherwise provided separately, either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications are each separately hereby incorporated by reference in their entirety.

What is claimed is:

1. A method for reproducing a designer intended color when said color is ambiguously defined in a document creation application, the method comprising:
    displaying a document on a display device;
    receiving a user selection of at least one object with at least one designer intended color in said document to be processed;
    capturing at least a portion of color signals in a device-dependent color space being used by said display device to display said object with said one designer intended color in said document;
    converting said object with said one designer intended color to a portable document format (PDF);
    identifying any device-independent color settings in said PDF;
    processing said captured color signals through a profile of said display device and said device-independent color settings that have been identified in said PDF to generate respective color values in a desired color device independent-color space;
    using said generated color values to produce a definition for each of said designer intended colors, wherein said definition of said designer intended color comprises any of: a definition of a spot color, and a definition of a mixture of at least two colors with at least one of said colors being a device-independent spot color; and
    providing said color definitions to a color management system of a document reproduction device for accurate rendition of said designer intended colors.

2. The method of claim 1, wherein said captured color signals are stored in advance of being processed to generate said respective color values.

3. The method of claim 1, wherein color signals are captured directly from said display by a color measurement instrument comprising any of: a colorimeter and a spectrophotometer.

4. The method of claim 1, wherein said document contains objects in a form comprising one or both of: a vector graphic, and a raster image.

5. The method of claim 1, further comprising providing said display profile to said color management system.

6. The method of claim 1, wherein said color signals are captured in response to an initiating event, comprising any of:
   saving said displayed document to said storage device;
   communicating said displayed document to a computing system;
   providing said displayed document to a color management system; and
   providing said displayed document to a document reproduction device.

7. The method of claim 1, further comprising storing said definition of said designer intended color with said document such that said designer intended color can be unambiguously reproduced on an output print of said document.

8. The method of claim 1, wherein said designer intended colors are specified at gradient stops.

9. A system for reproducing a designer intended color when said color is ambiguously defined in a document creation application, the system comprising:
   a memory and a storage medium; and
   a processor in communication with said storage medium and said memory, said processor executing machine readable instructions for performing the method of:
   displaying a document on a display device;
   receiving a user selection of at least one object with at least one designer intended color in said document to be processed;
   capturing at least a portion of color signals in a device-dependent color space being used by said display device to display said object with said one designer intended color in said document;
   converting said object with said one designer intended color to a portable document format (PDF);
   identifying any device-independent color settings in said PDF;
   processing said captured color signals through a profile of said display device and said device-independent color settings that have been identified in said PDF to generate respective color values in a desired color device independent-color space;
   using said generated color values to produce a definition for each of said designer intended colors, wherein said definition of said designer intended color comprises any of: a definition of a spot color, and a definition of a mixture of at least two colors with at least one of said colors being a device-independent spot color; and
   providing said color definitions to a color management system of a document reproduction device for accurate rendition of said designer intended colors.

10. The system of claim 9, wherein said captured color signals are stored in advance of being processed to generate said respective color values.

11. The system of claim 9, wherein color signals are captured directly from said display by a color measurement instrument comprising any of: a colorimeter and a spectrophotometer.

12. The system of claim 9, wherein said color signals are captured in response to an initiating event, comprising any of:
   saving said displayed document to said storage device;
   communicating said displayed document to a computing system;
   providing said displayed document to a color management system; and
   providing said displayed document to a document reproduction device.

13. The system of claim 9, further comprising storing said definition of said designer intended color with said document such that said designer intended color can be unambiguously reproduced on an output print of said document.

14. The system of claim 9, wherein said document contains objects in a form comprising one or both of: a vector graphic, and a raster image.

15. The system of claim 9, further comprising providing said display profile to said color management system.

16. The system of claim 9, wherein said designer intended colors are specified at gradient stops.

* * * * *